Feb. 13, 1968
J. B. GODSHALK
3,368,579
POULTRY WATERING VALVES
Original Filed Dec. 2, 1964
4 Sheets-Sheet 1
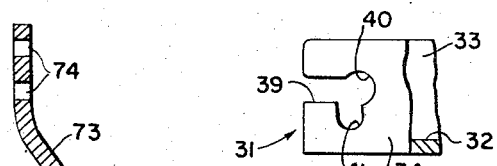
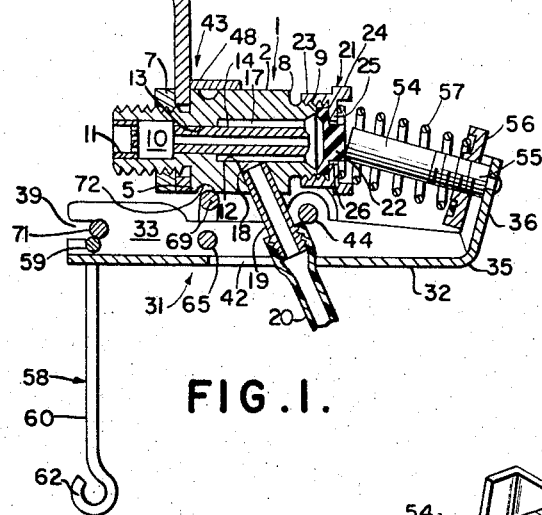
INVENTOR
James B. Godshalk
BY Arnold and Roylance
ATTORNEYS Feb. 13, 1968   J. B. GODSHALK   3,368,579
POULTRY WATERING VALVES
Original Filed Dec. 2, 1964   4 Sheets-Sheet 2

INVENTOR
James B. Godshalk

BY *Arnold & Roylance*
ATTORNEYS

INVENTOR
James B. Godshalk

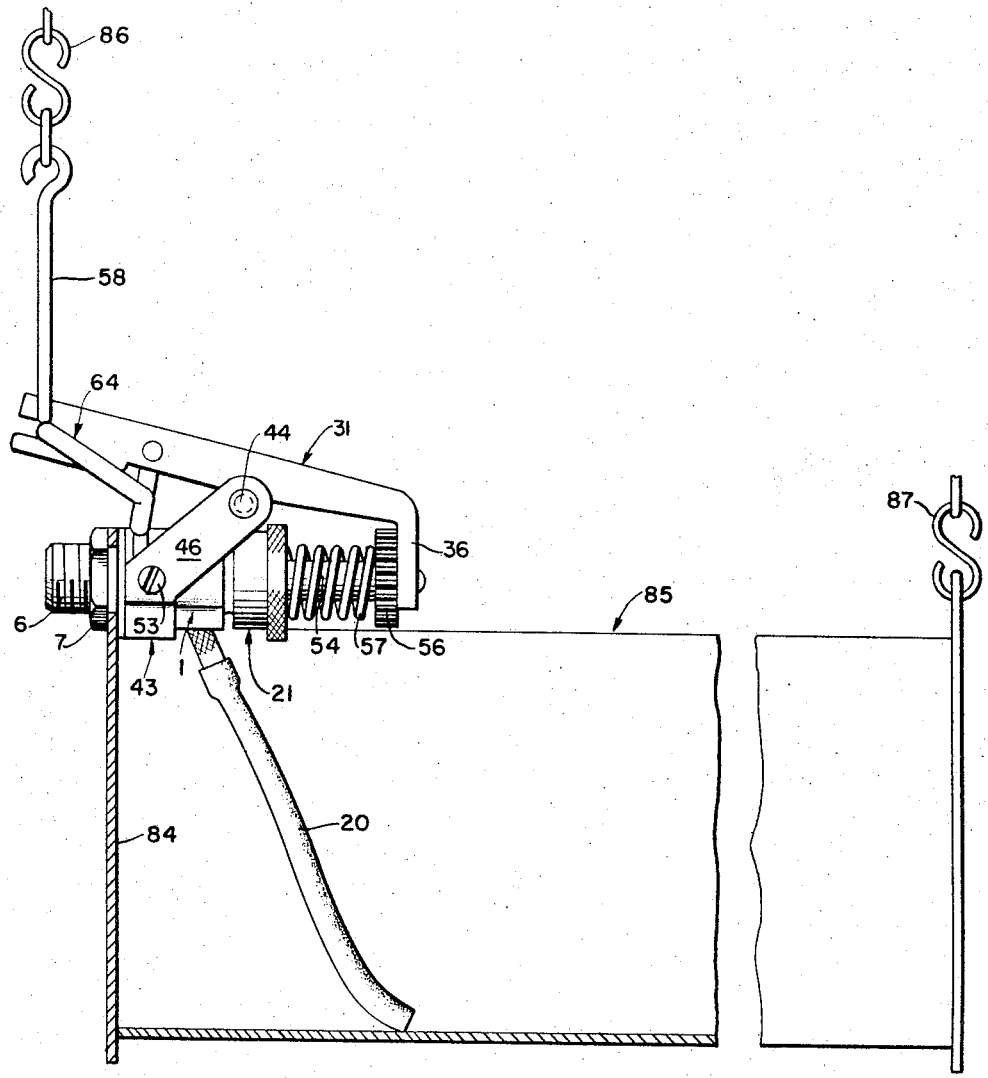

United States Patent Office 3,368,579
Patented Feb. 13, 1968

3,368,579
POULTRY WATERING VALVES
James B. Godshalk, Yardley, Pa., assignor to Fox Products Company, Philadelphia, Pa., a corporation of Pennsylvania
Continuation of application Ser. No. 415,329, Dec. 2, 1964. This application Mar. 22, 1967, Ser. No. 625,267
9 Claims. (Cl. 137—403)

ABSTRACT OF THE DISCLOSURE

The invention provides a weight-operated poultry watering valve which can be converted from one mode of use to another simply by changing the manner in which a bracket is mounted on the valve body. The body has a longitudinally extending duct terminating in an orifice end, a chamber outside of the duct into which water from the orifice end flows when the valve is open, and a discharge opening communicating with that chamber and directed laterally of the body. A movable valve element, such as a flexible diaphragm, is carried by the valve body so as to be movable into engagement with the orifice end of the duct to close the valve, or away therefrom to open the valve. An elongated operating arm is pivotally carried by the bracket, and the bracket can be mounted selectively in either of two positions. In one bracket position, the arm extends generally lengthwise of and beside the valve body on the side thereof from which the discharge opening is directed. In the other position, the arm extends in the same general fashion, but adjacent the opposite side of the valve body. With the valve assembled with the arm in the first position mentioned, the valve can be rigidly supported, with the watering receptacle suspended from the operating arm. When assembled with the arm in the other position, the valve body is secured to the receptacle and the combination of the receptacle and valve is suspended via the operating arm.

---

This application is a continuation of Ser. No. 415,329, now abandoned.

This invention relates to poultry watering valves and, more particularly, to weight-operated valves for automatically maintaining a desired level of water in a receptacle such as a poultry watering trough, pan or bowl.

In the raising of poultry, it is common practice to employ watering receptacles connected to a weight-operated valve in such fashion that the valve responds to the combined weight of the receptacle and the water therein, the valve opening automatically when there is too little water and closing when the weight indicates that the proper level of water has been reestablished. The watering receptacle can take various forms and it has heretofore been necessary for the valve manufacturer to supply a different valve for each type of receptacle and for varying types of installations. In some instances, the valve is rigidly supported and one end of an elongated watering trough is suspended from the movable operating member of the valve, as seen for example in U.S. Patent Re. 23,447, issued Dec. 24, 1951, to Virgil H. Pruitt. In other cases, when the receptacle is in the nature of a pan or bowl, the receptacle is wholly supported by the movable operating member of the valve. In still other cases, as disclosed in my U.S. Patents 3,034,481, issued May 15, 1962, and 3,132,664, issued May 12, 1964, the body of the valve is fixed directly to the watering receptacle, and the combination of the receptacle and valve is suspended via the movable operating member of the valve. Since there is need for keeping the cost of the valves as low as possible, there has been an active demand for a valve of the type described which could be universally adapted for use with different types of watering receptacles and in different types of installations.

It is accordingly a general object of this invention to devise an automatic weight operated valve of such nature that the manufacturer can offer a single model which can be used in all of the various manners described above.

Another object is to provide a weight operated valve which can be converted from one mode of use to another simply by the manner in which a bracket is mounted on the valve body.

A further object is to provide a particularly effective and economical poultry watering valve.

Still another object is to devise a valve of the type described which is substantially free from the adverse effects heretofore caused by particles of foreign matter in the water flowing through the valve.

In order that the manner in which the foregoing and other objects are achieved in accordance with the invention can be understood in detail, one advantageous embodiment of the invention will be described with reference to the accompanying drawings, which form part of this specification, and wherein:

FIG. 1 is a longitudinal sectional view of a valve constructed in accordance with the invention and assembled for use in installations, such as those shown in FIGS. 8 and 9, wherein the valve is fixed rigidly to a support and a watering receptacle is suspended from the operating arm of the valve;

FIG. 2 is a perspective view of the operating arm, suspension member and latch member assembly of the valve of FIG. 1;

FIG. 2A is a fragmentary side elevational view of an end portion of the operating arm of FIG. 2;

FIG. 3 is a perspective view of the valve body employed in the device of FIG. 1;

FIG. 4 is a perspective view of a bracket for mounting the assembly of FIG. 2 on the body of FIG. 3;

FIG. 5 is an end elevational view of a cap member and diaphragm employed in the valve of FIG. 1;

FIG. 6 is a cross-sectional view taken on line 6—6, FIG. 5;

Figure 8:
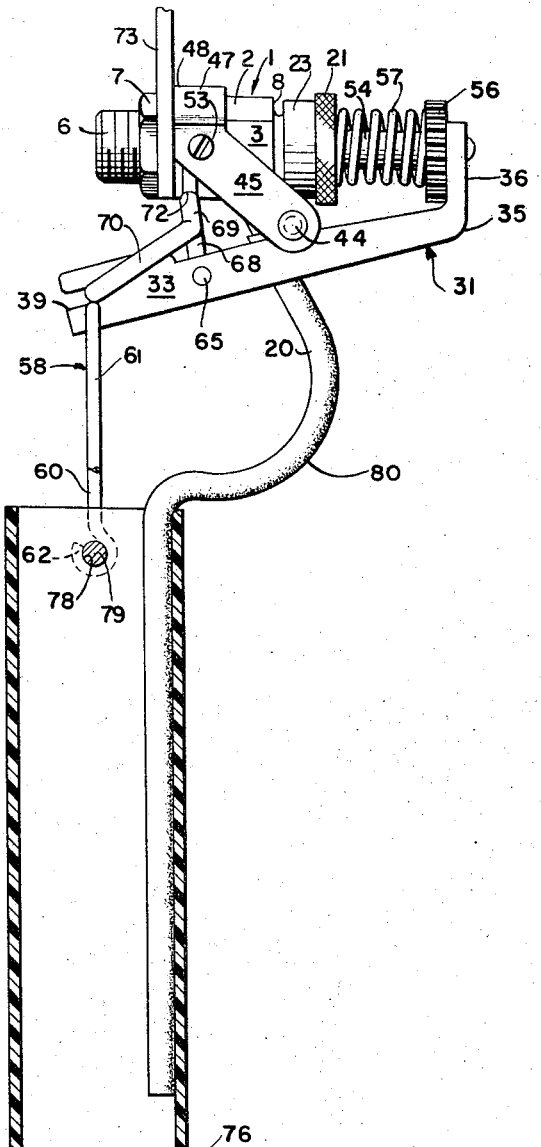
FIG. 8 is a view, partly in side elevation and partly in vertical section, illustrating the valve of FIG. 1 employed to maintain water in a receptacle of the pan type.
Figure 9:
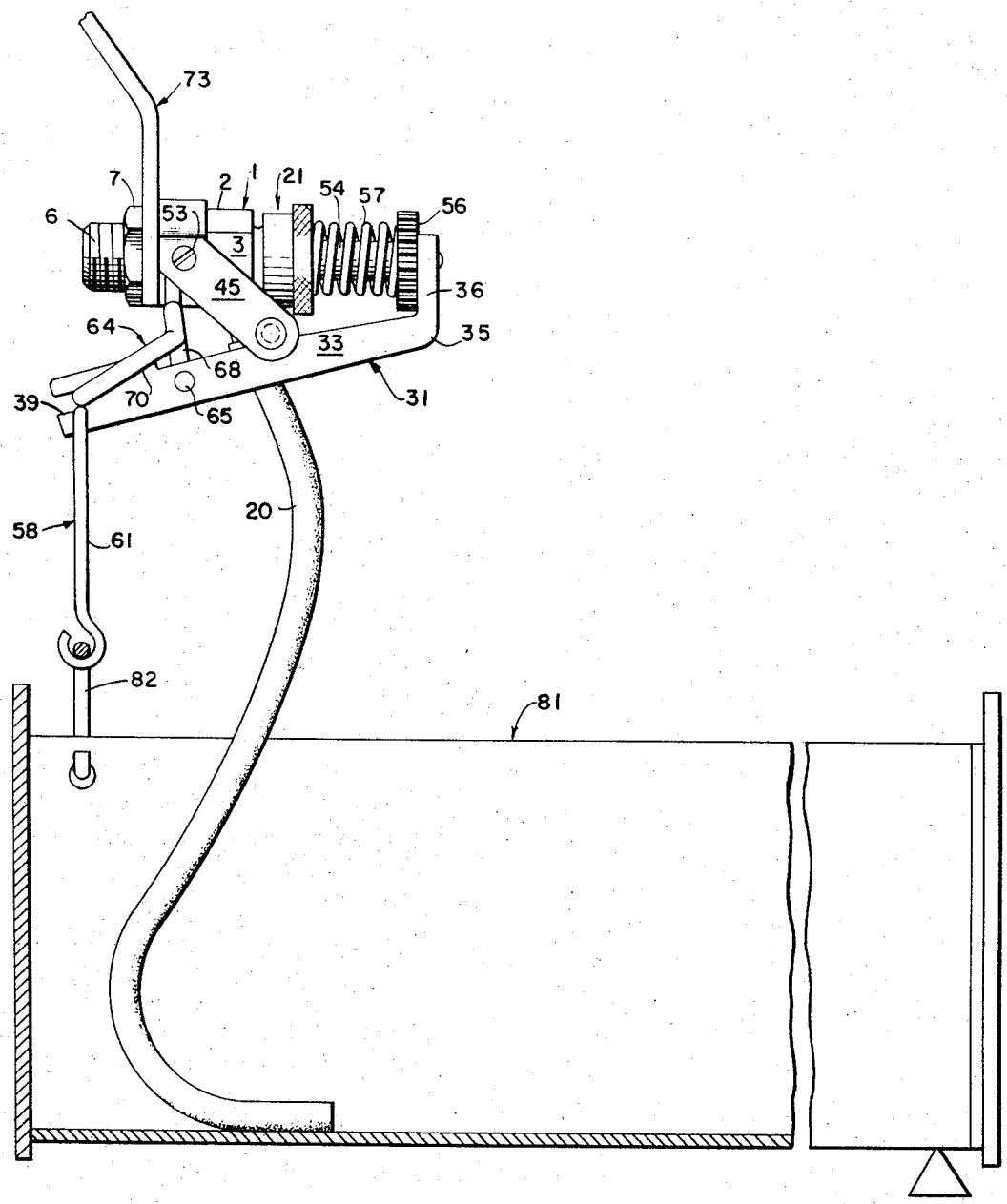

FIG. 9 is a view similar to FIG. 8, showing the valve of FIG. 1 employed in conjunction with a watering trough, one end of the trough being suspended from the operating arm of the valve; and FIG. 10 is a view similar to FIG. 8 but showing the valve reassembled and installed with its body fixedly attached to the end wall of a watering trough, the combination of the trough and valve being suspended via the operating arm of the valve.

Referring now to the drawings in detail, and first to FIGS. 1–7 thereof, it will be seen that the embodiment of the invention here shown comprises a valve body indicated generally at 1 and fabricated from a piece of metal stock of hexagonal transverse cross section. The valve body is elongated and includes a main body portion 2 which retains the hexagonal cross section of the original stock and includes two opposed flat side surfaces 3 which, as will appear hereinafter, are to be disposed in vertical position when the valve is horizontally mounted. Two transversely aligned, outwardly opening, interiorly threaded bores 4 are provided, each opening through one of the surfaces 3.

At one end of the valve body, hexagonal portion 2 terminates in a transverse annular shoulder 5, the end portion 6 of the body projecting beyond that shoulder being exteriorly threaded to cooperate with a clamping nut 7. At its other end, hexagonal portion 2 terminates in a transverse annular shoulder 8 and the smaller diameter end portion 9 of the valve body, projecting beyond shoulder 8, is exteriorly threaded.

Portion 6 is provided with an axially extending input bore 10, a cup-shaped filter element 11 being fitted in the open outer end of bore 10. A plane cylindrical bore 12, coaxial with bore 10, extends through end portion 9 and for the greater portion of the length of hexagonal portion 2 of the body. The inner ends of bores 10 and 12 are spaced apart axially and, between these two bores, the valve body is provided with an intermediate bore 13 of smaller diameter than bores 10 and 12. A duct member 14 is secured in intermediate bore 13, as by a pressed fit, and projects for substantially the entire length of bore 12, terminating in a frusto-conical tip 15 constituting the orifice end of the duct member. The narrow, flat, annular end face 16 of tip 15 lies approximately in the transverse plane occupied by the end of exteriorly threaded portion 9 of the valve body.

The outer surface of duct member 14 and the wall of bore 12 coact to define an annular chamber 17. A generally lateral bore 18 opens through the wall of body portion 2 and communicates with chamber 17. An outlet tube 19 is fixed in bore 18 and projects generally laterally from the valve body, being provided with an exteriorly serrated tip portion on which is telescopically disposed the end portion of a flexible outlet tube 20. The outlet port 18 is centered between the two opposed flat surfaces 3 of body portion 2 and lies in a plane parallel to those surfaces so that, when the valve body is horizontally disposed with surfaces 3 extending vertically, outlet member 19 can be downwardly directed as shown. Advantageously, outlet port 18 and member 19 are inclined downwardly and away from the inlet end of the valve body.

The inner end of annular chamber 17 is closed by the shoulder provided at the junction between bores 12 and 13. The outer end of chamber 17 is closed by the combination of a cap member 21 and a flexible diaphragm 22, the diaphragm 22 constituting the movable element of the valve. Cap member 21 includes a tubular cylindrical portion 23 which is internally threaded and engaged with the external threads of body portion 9. The remainder of cap member 21 is in the form of a shallow cup, including a peripheral wall 24 concentric with and larger than tubular portion 23, and a transverse annular wall portion 25 provided with a circular, centrally disposed opening 26, FIG. 6.

The diaphragm 22 has a flat annular peripheral portion 27 and a centrally disposed body portion 28, body portion 28 being substantially thicker, in an axial direction, than is portion 27 and projecting from one side of the diaphragm, as best seen in FIG. 6. On the side of the diaphragm opposite the central body portion 28, there is a shallow, cup-shaped recess defined by frusto-conical wall portion 29 and a flat circular portion 30. The diameter of portion 30 is distinctly larger than the outer diameter of the annular end face 16 of the tip of duct member 14. Because of the presence of frusto-conical wall portion 29, the annular portion of the diaphragm disposed between the outer edge of portion 30 and the peripheral portion of the diaphragm is significantly thinner than is the peripheral portion, so that adequate flexibility is provided to assure that the axially thickened portion 28 of the diaphragm can be displaced axially relative to the periphery of the diaphragm when the latter is secured against movement.

The dimensions of diaphragm 22 are such that the diaphragm can be accommodated within cap member 21 in the fashion seen in FIGS. 1, 5 and 6. Thus, the peripheral portion of the diaphragm is embraced by portion 23 of the cap member and is axially supported, on one side, by the inwardly projecting part of wall 25. The thickened central body portion 28 of the diaphragm projects through central opening 26 in the transverse wall 25 of the cap member. When the diaphragm is thus disposed in the cap member and the internally threaded portion 23 of the cap member is engaged over externally threaded portion 9 of the valve body, the periphery of the diaphragm is clamped between the valve body and the transverse annular wall portion 25 of the cap member so that the diaphragm is effective to sealingly close the outer end of annular chamber 17, as will be clear from FIG. 1.

Diaphragm 22 is formed of a suitable resilient material, such as natural or synthetic rubber, and has a normal or relaxed position, seen in FIGS. 1 and 6. With the diaphragm in this normal or relaxed position, the flat circular central face 30 is disposed in a plane between the two side surfaces of the peripheral portion of the diaphragm. This being so, and the end face 16 of the tip of duct member 14 lying substantially in the plane of the end face of body portion 9, the flat circular portion 30 of the diaphragm will be spaced axially from end face 16 so long as the diaphragm is allowed to remain in its relaxed position. Under these circumstances, the bore through duct member 14 communicates with chamber 17 and water supplied via bore 10 can thus flow freely through chamber 17 and discharge via outlet member 19 and tubing 20.

The valve includes an elongated operating arm indicated generally at 31, FIG. 2. Formed from stiff sheet metal or equivalent material, arm 31 is of U-shaped cross section so as to include a flat main wall 32 and flat, parallel side flanges 33 and 34. Throughout most of its length, portion 32 of the operating arm is straight. At one end of the arm, however, portion 32 is bent at 35, and side flanges 33 and 34 are correspondingly shaped, so as to provide an offset end portion 36. The line of bend 35 extends transversely of the operating arm and at right angles to the parallel planes in which side flanges 33 and 34 are disposed.

Intermediate the ends of the arms, side flanges 33 and 34 are provided with transversely aligned bearing openings 37 and 38, respectively. At the end of the operating arm opposite offset portion 36, side flanges 33 and 34 are provided with identical, transversely aligned notches. Each such notch includes a throat portion 39 which opens into two circular portions 40 and 41, circular portion 40 being nearer the free edge of the side flange while circular portion 41 is nearer the flat portion 32 of the arm. As will be clear from FIG. 2A, circular portions 40 and 41 overlap, so that both of the circular portions communicate with each other and with throat 39.

In the general location of bearing openings 37 and 38, the flat bottom wall portion 32 of arm 31 is provided with an opening 42, FIG. 2, to accommodate the outlet tube 20 when the valve is assembled in the fashion seen in FIGS. 1, 8 and 9.

The operating arm 31 is pivotally mounted on valve body 1 by means of a bracket indicated generally at 43 and shown in detail in FIG. 4, and a bearing pin 44. Formed from stiff sheet metal or the like, the bracket 43 is an integral unit and comprises two spaced parallel arms 45 and 46 carried by a bridging portion 47 which is bent at its center, along a line indicated at 48, FIG. 4, so that the two halves of the bridging portion can each lie in flush engagement with a different one of two adjacent flat surfaces of the hexagonal portion 2 of the valve body. The arms 45 and 46 project each from a different end of bridging portion 47 and are so disposed as to be capable of lying in flush engagement with the two opposed flat surfaces 3 of hexagonal portion 2 of the valve body. Adjacent their free ends, arms 45 and 46 are provided with circular openings 49 and 50, respectively, to accommodate the bearing pin 44. The end portions of arms 45 and 46 which are joined to the bridging portion 47 are provided with transversely aligned openings 51 and 52, respectively, to accommodate mounting screws 53, FIG. 8, which are respectively engaged in the threaded bores 4 in the valve body.

From FIGS. 1 and 8, it will be clear that, when the bracket 43 is fixed to the valve body by screws 53, bridging portion 47 and arms 45 and 46 are in direct engagement with side surfaces of the hexagonal portion 2 of the valve body, the arms 45 and 46 projecting beyond the body so that the pivotal axis defined by openings 49 and 50 extends transversely of the body and is spaced laterally therefrom. The valve operating arm 31 is secured in place by first positioning the operating arm in such fashion that the portions of side walls 33 and 34 containing bearing openings 37 and 38 are disposed each on the inner side of a different one of bracket arms 45 and 46, the bearing pin 44 then being passed through openings 37, 38, 49 and 50. The bearing pin can be secured in any suitable fashion, as by being provided with a bifurcated tip which is bent outwardly to engage the outer surface of the appropriate one of arms 45 and 46.

The length of operating arm 31 is such, and the bearing openings 37 and 38 are so located, that the offset portion 36 of the operating arm is spaced by a substantial distance from the cap member 21. A rigid actuating member 54 is fixedly attached to the offset portion 36 of the operating arm and projects from that portion generally toward the center of cap member 21. Actuating member 54 includes a threaded portion 55, a suitable retaining nut 56 being threadedly engaged on portion 55 before the actuating member is secured to the operating arm. To provide for a rigid connection between member 54 and arm portion 36, the arm portion can be provided with an aperture and the threaded portion 55 is provided with a tip of reduced diameter which extends through this aperture and is upset on the side of portion 36 opposite the main body portion of member 54, as will be clear from FIG. 1. A helical compression spring 57 surrounds member 54 and is engaged between nut 56 and cap member 21.

The normal effect of spring 57 is to urge the operating arm 31 pivotally in a direction which moves actuating member 54 away from the diaphragm 22. When arm 31 is pivoted in the opposite direction, spring 57 is compressed, and actuating member 54 is swung into a position in which the same is in general axial alignment with duct member 14. When in this position, the actuating member 54 has engaged and displaced the central, thicker body portion 28 of the diaphragm so that face 30 of the diaphragm is urged into fluid-tight engagement with the annular end face 16 of the tip of duct member 14, thus preventing water from flowing through the duct member into annular chamber 17. In this connection, it will be noted that the tip of actuating member 54 presents a flat transverse surface which is materially larger in diameter than is the annular end face 16 of the tip of duct member 14. Further, the relatively thick central portion 28 of the diaphragm is of substantially larger diameter than is the tip of the actuating member 54 which engages the same.

Cooperating with operating arm 31 is a suspension bail indicated generally at 58. The bail is formed of stiff metal wire of circular transverse cross section and includes a straight portion 59 and side arms 60 and 61, the latter being bent inwardly toward each other adjacent their tips and the tips of the arms being formed into hooks 62 and 63, respectively. The straight portion 59 is slightly longer than the space between the outer surfaces of flanges 33 and 34 of the operating arm. The diameter of the wire from which the bail is formed is such that portion 59 of the bail can be passed through the transversely aligned throats 39 and into the circular notch portions 41, as will be apparent from FIG. 2.

Arm 31 also carries a manually adjustable latch member, indicated generally at 64 and seen in detail in FIG. 2, which serves both as a means for securing arm 31 in a valve-closing position and as means for retaining portion 59 of the suspension bail securely within circular notch portions 41. The latch member 64 is formed as an integral unit from stiff, cylindrical metal wire and includes a straight portion 65 which projects transversely of arm 31 through transversely aligned openings 66 and 67 in the side flanges 33 and 34, respectively, of the arm. At one of its ends, straight portion 65 is joined to a second straight portion 68, the latter extending at right angles to portion 65. At its opposite end, portion 68 joins a straight portion 69 which lies in a common plane with portion 65 and slants toward the free end of portion 65. Thus, the end of portion 69 joined to portion 68 is spaced from portion 65 by a distance greater than is the opposite end of portion 69. The end of portion 69 adjacent the free end of portion 65 joins a straight portion 70 which is at right angles to portion 65 and which projects from the common plane of portions 65 and 69 at an angle such that, when the common plane of portions 65 and 69 is approximately at right angles to arm portion 32, portion 70 intersects the transverse line determined by notch portions 40. At its free end, portion 70 joins a straight portion 71 which extends parallel to the common plane of portions 65 and 69 and projects from portion 70 generally toward the end of the latch member occupied by portion 68.

Portion 65 of the latch member is more than twice as long as the distance between the outer faces of the side flanges 33 and 34 of the operating arm. Portion 71 of the latch member, on the other hand, is only slightly longer than that distance. Accordingly, the latch member can be installed on the operating arm by first disposing portion 65 in alignment with openings 66 and 67, and manipulating the latch member so that portion 71 thereof is spaced away from the free edges of side flanges 33 and 34. With the latch member in this position, portion 65 is inserted through openings 66 and 67 until portion 68 lies adjacent the outer surface of flange 33. The latch member is then pivoted about the axis provided by portion 65 until portion 71 of the latch member is aligned with notch portions 40. The latch member is then shifted transversely of the operating arm in a direction causing portion 71 of the latch member to extend through notch portions 40.

Notch portions 41 are of such diameter that the straight portion 59 of bail 58 can be moved laterally into notch portions 41 simply by inserting that portion of the bail through the throats 39 of the transversely aligned notches. The diameter of portion 71 of the latch member 64, and the locations of notch portions 40 relative to the mouths of notch portions 41 are such that, assuming that portion 59 of the suspension bail is in place in notch portions 41, insertion of portion 71 of the latch member into notch portions 40 will serve to block bail portion 59 from escaping from notch portions 41, as will be apparent from FIG. 2.

Figure 7:
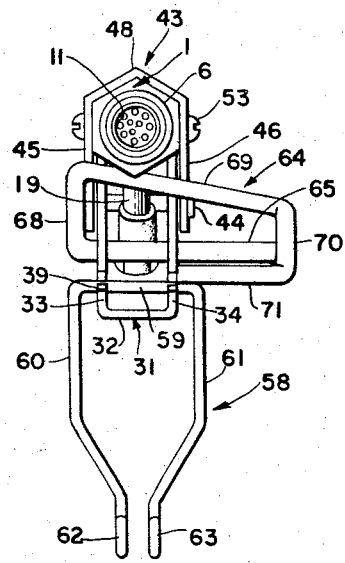
FIG. 7 is an end elevational view of the valve of FIG. 1, showing the latch in a position which maintains the valve closed.

As best seen in FIG. 3, hexagonal portion 2 of valve body 1 is provided with a transverse outwardly opening annular groove 72 disposed immediately adjacent to shoulder 8, this groove being of semicircular transverse cross section and being so located as to accommodate portion 69 of latch member 64, as seen in FIG. 1. When latch member 64 is shifted, transversely relative to arm 31, in a direction to move portion 68 away from the operating arm and to move portion 70 into proximity with side flange 34, the space between portion 65 and the corresponding end of portion 69 is small enough to allow the operating arm 31 to swing in a clockwise direction, as viewed in FIG. 1, sufficiently to open the valve by withdrawing actuating member 54 from engagement with the central portion 28 of diaphragm 22. Also, when latch member 64 is in the position just described, the suspension bail 58 is securely locked in place by presence of portion 71 of the latch member within notch portions 40. On the other hand, when latch member 64 is shifted transversely of the operating arm 31 in a direction bringing portion 68 of the latch member into proximity with side flange 33, as seen in FIG. 7, the space between the corresponding ends of portions 65 and 69 is adequately large to force the operating arm in a counter-clockwise direction, as viewed in FIG. 1, and latch the valve in closed position, with actuating member 54 firmly pressing the central portion 28 of diaphragm 22 against the annular end face 16 of duct member 14. Thus, the latch member is characterized by a wedging or camming action which forces the operating arm to swing into a valve-closing position and to remain in that position until the latch member is again shifted in a direction moving portion 68 away from the operating arm. Because of the relatively short length of portion 71 of the latch member, shifting of the latch member to a position in which the valve is fully latched closed will result in withdrawal of portion 71 from engagement in notch portions 40, so that, being now certain that the valve will remain closed, the operator can disengage the suspension bail 58 from the operating arm.

Groove 72 provides a guide surface which is directed toward operating arm 31, whether the arm is disposed below the body 1, as seen in FIGS. 1, 8 and 9, or above the body, as in FIG. 10. Regardless of the position occupied by latch member 64, portion 69 thereof is disposed to engage in groove 72, so long as both portions 65 and 71 are engaged in the corresponding openings in the side flanges of the operating arm.

The assembled valve can be rigidly supported, as by a bracket 73, FIG. 1, when the valve is to be employed in the fashion illustrated in FIGS. 8 and 9. The bracket 73 can be of any suitable rigid material and is provided at its lower end with a circular opening through which end portion 6 of the valve body extends so that the valve body can be rigidly attached to the bracket by the cooperation of clamping nut 7 and shoulder 5. Bracket 73 can be provided, at its opposite end, with a number of spaced apertures 74 to accommodate bolts or other fastening means for securing the bracket to any suitable supporting structure (not shown).

In the arrangement illustrated in FIG. 8, the valve is assembled in the fashion shown in FIG. 1 and is employed in conjunction with a pan-type poultry waterer comprising a shallow circular pan 75 to which is secured an upright, centrally located, cylindrical tube 76. Tube 76 is provided with outlet openings 77 at its lower end, the upper end of the tube being open and having transversely aligned openings 78 which accommodate a transversely extending supporting rod 79 engaged in the hooked ends of the arms of the suspension bail 58.

The valve having been assembled in the fashion described with reference to FIG. 1, the operating arm 31 extends lengthwise of the valve body and is disposed therebelow, the outlet member 19 extending generally downwardly and the outlet tubing 20 passing through opening 42 in the operating arm. The flexible tubing 20 is extended downwardly within the supporting tube 76 of the watering pan, a free loop being provided at 80 in the flexible tubing in order to assure freedom of movement of the watering pan relative to the valve body. The watering pan can be easily suspended from the operating arm of the valve by first adjusting latch member 64 to its valve-closing position, then engaging the hooked ends 62 and 63 of the suspension bail about rod 79, then inserting bail portion 59 into notch portions 41, and finally returning latch member 64 to the position seen in FIG. 2 to lock the suspension bail in place and free the operating arm 31 for movement in a valve-opening direction. Under these circumstances, the weight of the watering pan is inadequate to overcome the biasing force provided by spring 57 and the valve is therefore maintained initially open by the biasing spring. Water accordingly flows through inlet duct 10, duct member 14, annular chamber 17, outlet member 19 and tubing 20 into the tube 76, discharging into the watering pan 75 via the outlet opening 77 in tube 76. When an adequate quantity has collected in the pan, the combined weight of the water, the pan, and the elements directly attached to the pan will be adequate to apply to the operating arm 31 a force sufficient to overcome the biasing action of spring 57. Accordingly, the operating arm 31 will be pivoted in a counterclockwise direction, as viewed in FIG. 1, to cause actuating member 54 to force the central portion 28 of diaphragm 22 into engagement with the tip of duct member 14, thus closing the valve and preventing further supply of water therethrough.

Still assembled in the same fashion described with reference to FIG. 1, the valve can be employed to maintain a desired level of water in an elongated poultry watering trough in the general fashion shown in FIG. 9. Here, the valve is still rigidly supported in a horizontal position by bracket 73 and one end portion of the trough 81 is attached to the operating arm 31 via suspension bail 58 and a second bail 82 which is engaged in hooks 62 and 63 and connected directly to the trough. Operation of the valve in the assembly illustrated in FIG. 9 is essentially the same as hereinbefore described with reference to FIG. 8. In both instances, it is to be noted that, since the outlet member 19 of the valve projects downwardly, the flexible tubing 20 is easily attached and employed to deliver the water from the valve to a point adjacent the bottom of the watering pan or trough.

When the valve is to be fixedly attached to the watering receptacle, rather than having the valve supported by some other means and the receptacle suspended from the operating arm of the valve, it is only necessary to reassemble the valve in the fashion illustrated in FIG. 10. Here, the position of bracket 43 on the valve body is rotated 180°, so that the bracket arms 45 and 46 now project upwardly, rather than downwardly. The bracket is still secured by means of screws 53, these being again engaged in the threaded bores 4 in hexagonal portion 6 of the valve body. The operating arm assembly, including actuating member 54, nut 56, and biasing spring 57, is mounted on the valve in the same fashion hereinbefore described, by inserting bearing pin 44 through the aligned openings in the arms 45 and 46 of the bracket and in the side flanges 33 and 34 of the operating arm. Since bracket 43 has been inverted, as compared to the mode of assembly shown in FIG. 1, the operating arm now is disposed above the valve body. On the other hand, the outlet member 19 still projects downwardly.

The valve body is attached directly to the upright end wall 84 of the trough 85, wall 84 being provided with a circular opening through which end portion 6 of the valve body extends. End wall 84 is, of course, clamped securely between shoulder 5 and clamping nut 7.

The suspending bail 58 is pivoted to an upwardly projecting position and engaged with a suspension chain 86, so that the combination of the valve and the end portion of trough 85 is suspended from chain 86 via the operating arm of the valve. The opposite end of the trough can be supported in any suitable fashion, as by a second suspension chain 87.

Whether the valve is assembled for use in the manner shown in FIG. 8, or in the manner shown in FIG. 9, or in the manner shown in FIG. 10, water can be supplied to the valve by means of a flexible hose (not shown) engaged over and clamped to end portion 6 of the valve body 1.

While it is advantageous to have the portion 71 of latch member 64 engage in openings, such as notch portions 40, in both flanges 33 and 34, it will be understood that good results are also achieved when portion 71, being significantly shorter than shown, engages in a notch portion 40 only in flange 34 and does not project far beyond flange 34 when the latch member is in the position seen in FIG. 2. In all events, the latch member 64 has the important advantage of assuring that, when the valve is operating the supply water, the suspension bail 58 cannot become disengaged from the operating arm, since such disengagement would leave the valve open and supplying water continuously without provision for automatic closing of any kind.

The valve construction provided by the invention has the advantage that, when the discharge opening provided by element 19 is made small, chamber 17 will remain full of water when the valve is closed, and air thus is prevented from entering the chamber and causing rust formations and other deleterious oxidative changes.

Though particularly advantageous embodiments of the invention have been chosen for illustrative purposes, it will be understood that various changes and modifications can be made therein, without departing from the scope of the invention as defined in the appended claims.

What is claimed is:

1. In a poultry watering valve, the combination of
a valve body having
    a through duct extending from a water inlet end to an orifice end,
    means defining a chamber disposed outside of said duct to receive water from said orifice end, and
    a discharge opening communicating with said chamber and directed laterally of said body;
a movable valve element;
means carried by said body at said orifice end of said through duct and supporting said movable valve element for movement between an open position, in which said valve element is spaced from said orifice end, and a closed position, in which said valve element prevents water from flowing from said orifice end into said chamber;
an elongated operating arm;
a bracket,
    said arm and said bracket having cooperating means supporting said arm for pivotal movement about an axis which is transverse to said arm and located intermediate the ends thereof;
means for securing said bracket to said body with said arm extending generally lengthwise of and beside said body and an end portion of said arm spaced from said orifice end of said through duct;
an actuating member carried by said end portion of said arm and directed toward said movable valve member to actuate the same to said closed position when said arm is pivoted in one direction; and
compression spring means acting between said arm and said body to urge said arm in the other direction.

2. A valve according to claim 1, wherein
said body is provided with means at said inlet end of said duct whereby said body can be rigidly secured to a wall of a watering receptacle.

3. A valve according to claim 1, wherein
said spring means comprises a helical compression spring surrounding said actuating member and having one end engaged with a stop surface supported by said body.

4. A valve according to claim 3, wherein
said actuating member is elongated and at least a portion thereof adjacent said end portion of said arm is threaded, and
said biasing means includes a nut member adjustably engaged with said threaded portion of said actuating member, the other end of said helical compression spring being engaged with said nut member.

5. A valve according to claim 3, wherein
said movable valve element is a flexible diaphragm, and
said means carried by said body and supporting said movable valve element is a cap member having a threaded portion engaged with threads on said body, said cap member including
    an annular transverse wall portion disposed to clamp the peripheral portion of said diaphragm sealingly against a cooperating annular surface on said body, and
    a peripheral annular wall projecting away from said body and toward said end portion of said arm,
    said annular transverse wall portion constituting said stop surface, and said one end of said helical compression spring being surrounded by said peripheral annular wall.

6. A valve according to claim 3, wherein
said end portion of said actuating arm is laterally offset and projects from said arm in a direction extending generally across the longitudinal axis of said body.

7. A valve according to claim 6 and further comprising
means for mounting said body in a horizontal position;
said means for securing said bracket to said body being so constructed and arranged that said bracket can be secured to said body selectively in either of two positions,
    said arm being disposed below said body and extending generally lengthwise thereof when said bracket is secured in one of said positions,
    said arm being disposed above said body and extending generally lengthwise thereof when said bracket is secured in the other of said positions,
    said end portion of said arm projecting in a direction extending generally across the longitudinal axis of said body when said bracket is secured in either of said positions.

8. A valve according to claim 7, wherein
said body has two side surfaces and mutually similar top and bottom surfaces, and
said bracket has spaced parallel legs and a bridging portion interconnecting said legs at one end thereof,
    the space between the legs of said bracket being such that said bracket can straddle said body with said legs engaging said side surfaces when secured in either of said positions,
    said bridging portion extending across said top surface and said legs extending downwardly when said bracket is secured in said one position,
    said bridging portion extending across said bottom surface and said legs extending upwardly when said bracket is secured in said other position.

9. In a poultry watering valve, the combination of an elongated valve body having
an inlet,
    means forming a fixed valve element directed axially toward one end of said body and having an orifice communicating with said inlet, and
    an outlet to which water can be supplied from said inlet via said orifice;
means for mounting said body in a horizontal position;
an elongated operating arm having a straight portion and a laterally offset end portion;
a bracket,
    said bracket and said straight arm portion having cooperating means for mounting said arm on said bracket for pivotal movement about an axis transverse to said straight portion of said arm;
means for selectively securing said bracket to said body in either of two positions,
    said arm being disposed below said body and extending generally lengthwise thereof when said bracket is secured in one of said positions,
    said arm being disposed above said body and extending generally lengthwise thereof when said bracket is secured in the other of said positions, said laterally offset end portion of said arm being spaced from said one end of said body and projecting generally toward the longitudinal axis of said body when said bracket is secured in either of said positions;

a movable valve element carried by said body and movable axially thereof into and out of engagement with said fixed valve element;

an actuating member carried by said laterally offset end portion of said arm and projecting toward said movable valve element to actuate the same into valve-closing position when said arm is pivoted in one direction about said axis; and resilient means operatively connected to said arm to urge the same in the other direction.

References Cited
UNITED STATES PATENTS

| | | | |
|---|---|---|---|
| 2,739,609 | 3/1956 | Morris | 137—408 |
| 3,023,733 | 3/1962 | Ashby | 119—81 |

WILLIAM F. O'DEA, *Primary Examiner.*

D. R. MATTHEWS, *Assistant Examiner.*